(12) United States Patent
Dropps et al.

(10) Patent No.: US 9,350,276 B2
(45) Date of Patent: May 24, 2016

(54) ELECTRONIC CONTROL CIRCUITRY WITH START UP CAPABILITY

(71) Applicant: Sensata Technologies Massachusetts, Inc., Attelboro, MA (US)

(72) Inventors: Kevin J. Dropps, Berkley, MA (US); Leo Zhong, Kunshan (CN); Changyin Wang, Changzhou (CN); Jian Chen, Shanghai (CN)

(73) Assignee: Sensata Technologies Massachusetts, Inc., Attleboro, MA (US)

( * ) Notice: Subject to any disclaimer, the term of this patent is extended or adjusted under 35 U.S.C. 154(b) by 0 days.

(21) Appl. No.: 14/467,589

(22) Filed: Aug. 25, 2014

(65) Prior Publication Data

US 2015/0054446 A1    Feb. 26, 2015

(30) Foreign Application Priority Data

Aug. 26, 2013    (CN) .......................... 2013 1 0375814

(51) Int. Cl.
| | |
|---|---|
| *H02P 1/16* | (2006.01) |
| *H02P 23/00* | (2006.01) |
| *H02P 25/00* | (2006.01) |
| *H02P 1/44* | (2006.01) |
| *H02P 1/02* | (2006.01) |
| *H02P 1/42* | (2006.01) |

(52) U.S. Cl.
CPC ................ *H02P 1/445* (2013.01); *H02P 1/027* (2013.01); *H02P 1/42* (2013.01)

(58) Field of Classification Search
CPC ............. H02P 1/445; H02P 1/42; H02P 1/44; H02P 1/423; H02P 1/027; H02P 1/50; H02P 25/04; H02P 1/04; F25D 29/00; F25D 21/002; F25D 21/08; F25D 2700/10; F25D 2700/122; F25D 21/02; F25D 2700/12
USPC ......... 318/471, 473, 775, 778, 781, 785, 786, 318/788
See application file for complete search history.

(56) References Cited

U.S. PATENT DOCUMENTS

| | | | | |
|---|---|---|---|---|
| 3,544,869 | A | * | 12/1970 | McBride, Jr ........... H02H 5/042 318/788 |
| 3,555,355 | A | * | 1/1971 | Pfister .................... H02H 5/041 361/106 |

(Continued)

FOREIGN PATENT DOCUMENTS

| | | | | |
|---|---|---|---|---|
| JP | 06339291 | A | * | 12/1994 |
| JP | 08154367 | A | * | 6/1996 |

(Continued)

*Primary Examiner* — Paul Ip
(74) *Attorney, Agent, or Firm* — Chapin IP Law, LLC

(57) ABSTRACT

Certain configurations of the present disclosure present a PTC starter. The PTC starter includes a housing, a first conductive terminal (6), a second conductive terminal (7), a control PTC thermistor (3), a start PTC thermistor (4) and a TRIAC (5), wherein the control PTC thermistor (3), the start PTC thermistor (4) and the TRIAC (5) being accommodated in the housing, the start PTC thermistor (4) being connected in series with the TRIAC (5), wherein one electrode of the control PTC thermistor (3) is connected with the gate (G) of the TRIAC (5), the control PTC thermistor (3) is connected in series with the start PTC thermistor (4), the volume of the control PTC thermistor (3) is less than 30 mm3, and the distance between the control PTC thermistor (3) and the start PTC thermistor (4) is less than 5 mm.

21 Claims, 4 Drawing Sheets

(56) References Cited

U.S. PATENT DOCUMENTS

| | | | | |
|---|---|---|---|---|
| 3,562,587 | A * | 2/1971 | Forst | H02K 11/0047 318/473 |
| 3,586,939 | A * | 6/1971 | Buiting | H02P 1/42 318/792 |
| 3,633,036 | A * | 1/1972 | Nuckolls | H05B 37/0218 250/214 R |
| 3,683,250 | A * | 8/1972 | Fricker | H02P 1/44 318/788 |
| 3,822,560 | A * | 7/1974 | Hansen | F25D 21/02 62/140 |
| 4,191,665 | A * | 3/1980 | Mandai | H01C 7/025 252/519.12 |
| 4,267,635 | A * | 5/1981 | Blaha | H01C 7/022 29/612 |
| 4,353,025 | A * | 10/1982 | Dobkin | H02M 5/257 323/300 |
| 4,588,925 | A * | 5/1986 | Fahnrich | H05B 41/046 315/101 |
| 4,668,908 | A * | 5/1987 | Aoki | H02M 5/2573 323/239 |
| 4,894,637 | A * | 1/1990 | Yamada | H01C 1/01 338/22 R |
| 5,231,848 | A * | 8/1993 | Farr | F25D 29/00 361/103 |
| 5,345,126 | A * | 9/1994 | Bunch | H02K 17/08 310/68 C |
| 5,391,971 | A * | 2/1995 | Yamada | H02P 1/42 318/445 |
| 5,451,853 | A * | 9/1995 | Itoh | H02P 1/44 318/783 |
| 5,789,897 | A * | 8/1998 | Hamatani | H02P 1/445 318/783 |
| 5,952,811 | A * | 9/1999 | Hamatani | H02H 9/026 318/753 |
| 6,127,913 | A * | 10/2000 | Niino | H01H 61/002 337/343 |
| 6,851,270 | B2 * | 2/2005 | Denvir | F25D 21/002 62/154 |
| 6,930,464 | B2 * | 8/2005 | Han | H02P 1/445 318/775 |
| 7,061,204 | B2 * | 6/2006 | Unno | H02P 1/44 318/786 |
| 7,071,650 | B2 * | 7/2006 | Ilda | F04B 35/04 318/781 |
| 7,265,515 | B2 * | 9/2007 | Weihrauch | H01H 61/002 318/430 |
| 7,498,763 | B2 * | 3/2009 | Weigel | H02P 1/445 318/778 |
| 8,072,179 | B2 * | 12/2011 | De Pasca | H02P 1/42 318/781 |
| 2004/0244389 | A1 * | 12/2004 | Denvir | F25D 21/002 62/156 |
| 2005/0017670 | A1 * | 1/2005 | Han | H02P 1/445 318/781 |
| 2005/0184699 | A1 * | 8/2005 | Unno | H02P 1/44 318/786 |
| 2005/0231151 | A1 * | 10/2005 | Ilda | F04B 35/04 318/785 |
| 2006/0017417 | A1 * | 1/2006 | Botega | H02P 1/42 318/786 |
| 2006/0048530 | A1 * | 3/2006 | Jun | F04B 35/045 62/228.1 |
| 2006/0119308 | A1 * | 6/2006 | Weigel | H02P 1/445 318/778 |
| 2007/0257632 | A1 * | 11/2007 | Weigel | H02P 1/445 318/778 |
| 2010/0013426 | A1 * | 1/2010 | De Pasca | H02P 1/42 318/781 |
| 2013/0335874 | A1 * | 12/2013 | Chen | H01C 1/041 361/106 |

FOREIGN PATENT DOCUMENTS

| | | |
|---|---|---|
| JP | 2004187336 A * | 7/2004 |
| JP | 2005073330 A * | 3/2005 |

* cited by examiner

ELECTRONIC CONTROL CIRCUITRY WITH START UP CAPABILITY

RELATED APPLICATIONS

This application is related to and claims priority to Chinese Patent Application No. 201310375814.9 filed Aug. 26, 2013, the entire teachings of which are incorporated herein by this reference.

TECHNICAL FIELD

Certain embodiments herein are related to a positive temperature coefficient (PTC) thermistor starter, in particular, to a positive temperature coefficient (PTC) thermistor starter with low power consumption.

BACKGROUND

A driving circuit of a motor, e.g., for a compressor of a refrigerator, typically includes a main winding (operation winding) and a secondary winding (start winding), which are connected in parallel. In addition to working during motor start, the main winding continues to work during motor operation. The secondary winding works only during motor start. It is effectively disconnected and not used after motor start. According to conventional techniques, a PTC (Positive Temperature Coefficient) thermistor can be connected in series with the secondary winding. During motor start, both the main winding and the secondary winding work (that is, current flows) and the PTC thermistor has a low initial resistance which allows large current to flow through. During normal motor operation, when current continues to flow through the main winding and corresponding PTC thermistor, the PTC thermistor is heated with its resistance increasing rapidly, only low current passes through the circuit with the secondary winding and thus the secondary winding is taken out of functional service—as desired; due to the high resistance of the PTC thermistor. Such low current maintains the high resistance of the PTC thermistor being heated and produces about 3 W power consumption. Such power consumption is a waste of electric power because it is not used to power a respective motor.

Chinese patent application CN1168022A discloses a motor starting circuit, including a starting PTC, a TRIAC (a TRIode for Alternating Current) connected in series with a secondary winding, and a control PTC connected in parallel with a starting PTC, wherein one terminal of the control PTC is connected with the Gate of the TRIAC. When the motor starts, a trigger signal is provided to the Gate through the control PTC. Thus, the TRIAC is ON and the starting current flows through the secondary winding through the starting PTC. After the start of the motor, the starting PTC is heated itself as a result of its resistance increasing in passing current. Thus, the current through the secondary winding decreases. At the same time the resistance of the control PTC increases. Thus, the current flowing through the gate decreases and the TRIAC is turned OFF. In this state, ON current flows through the start PTC and the control PTC. Thus, the waste of the electric power is greatly decreased.

In CN1168022, since the starting PTC and the control PTC are connected in parallel, the staring current flows through the control PTC directly with large impact and thus the life of the control PTC is affected. In addition, with low current, since the starting PTC and the control PTC are connected in parallel, the half wave cycle becomes too long due to difference of the sensitivity of the gate depending on the trigger way, and the motor produces noise and fluctuation during rotation. In addition, since the volume of the control PTC is positively correlated with ON/OFF time, in order to avoid too short OFF time which may lead the motor failing to start, it is necessary that the volume of the control PTC is larger than 30 mm$^3$ under 100° C. Thus, the operation space is limited.

BRIEF DESCRIPTION

Embodiments herein include providing an improved motor start circuit solving one or more technical problems as discussed above.

In accordance with one non-limiting example embodiment, a PTC starter according to the present disclosure, includes a housing, a first conductive terminal, a second conductive terminal, a control PTC thermistor, a start PTC thermistor and a TRIAC, wherein the control PTC thermistor, the start PTC thermistor and the TRIAC are disposed in the housing, the start PTC thermistor being connected in series with the TRIAC, one electrode of the control PTC thermistor being connected with the gate of the TRIAC, the control PTC thermistor being connected in series with the start PTC thermistor.

In accordance with further embodiments, the volume of the control PTC thermistor is less than 30 mm$^3$, and the distance between the control PTC thermistor and the start PTC thermistor being less than 5 mm (millimeters).

In one non-limiting example embodiment, the volume of the control PTC thermistor is less than 10 mm$^3$ (cubic millimeters).

In another non-limiting example embodiment, the distance between the control PTC thermistor and the start PTC thermistor is less than 3 mm.

Further embodiments herein include an apparatus. The apparatus comprises: a TRIAC (TRIode for Alternating Current); a control PTC (Positive Temperature Coefficient) thermistor, the control PTC thermistor coupled to a gate of the TRIAC to control an amount of current passing through the TRIAC; and a start PTC thermistor, the start PTC thermistor in thermal communication with the control PTC thermistor, heat generated by the start PTC thermistor controlling a temperature of the control PTC thermistor.

In accordance with further embodiments, the start PTC thermistor is disposed in series with the control PTC thermistor.

The start PTC thermistor is disposed in series with the TRIAC.

In accordance with further configurations, a series circuit path through the TRIAC and the start PTC thermistor controls current through a winding in a respective motor. The motor can include any number of windings. In one embodiment, the winding controlled by the series circuit path is a secondary winding (start winding) in the respective motor. Via the series circuit path, the secondary winding is activated during start up of the respective motor. The transfer of the heat generated by the start PTC thermistor to the control PTC thermistor increases a respective resistance of the series circuit path. The increased resistance of the series circuit path substantially reduces the amount of current passing through the TRIAC and the corresponding secondary winding. Thus, after start up of the respective motor, current through the second winding is substantially reduced.

These and other more specific embodiments are disclosed in more detail

As discussed herein, techniques herein are well suited for controlling one or more windings in a respective motor. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
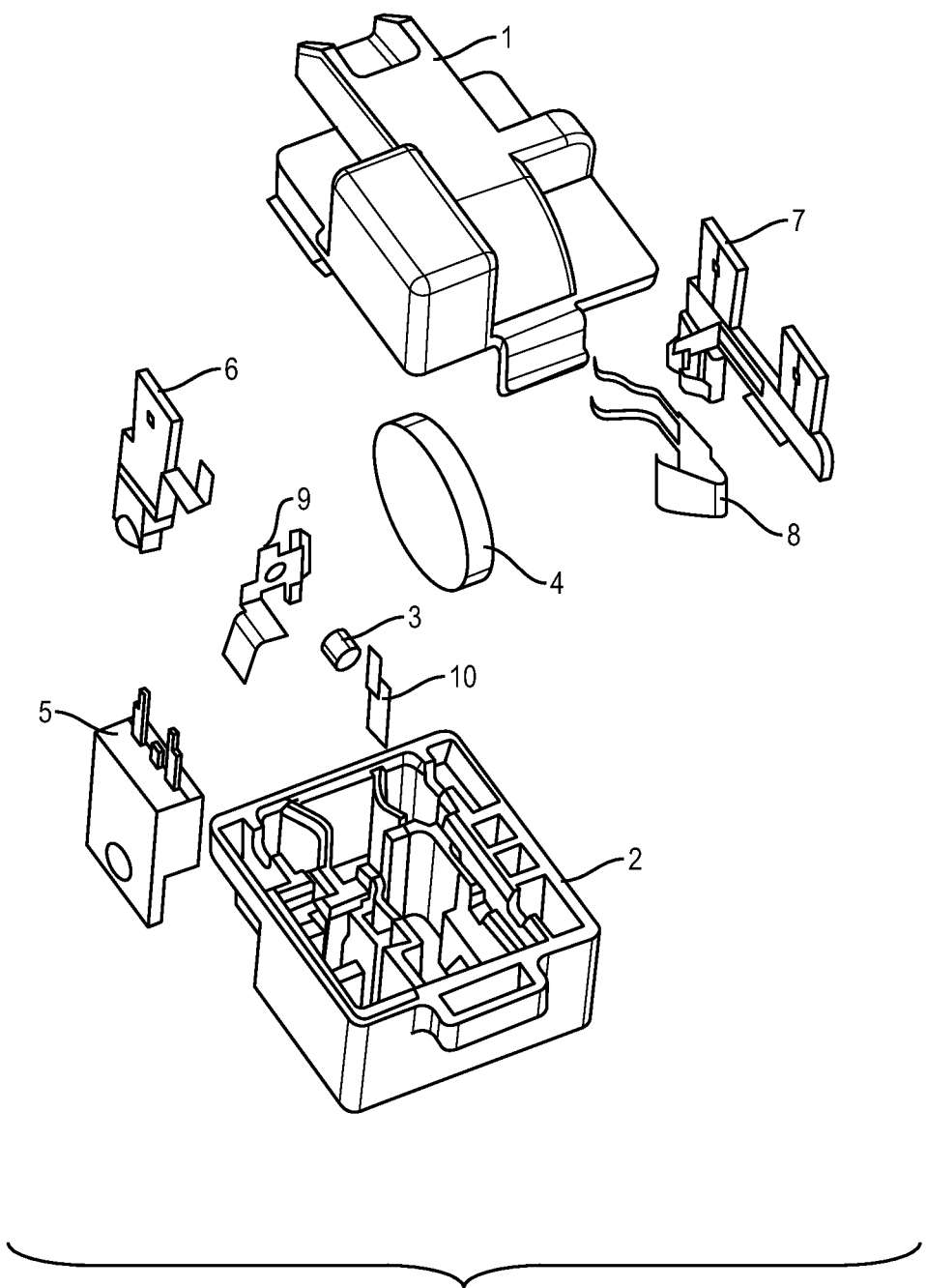
FIG. 1 is an exploded perspective view of a PTC starter according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

FIG. 1 shows an exploded perspective view of the PTC starter of the present disclosure. As shown in FIG. 1, the PTC starter includes a housing including a cover 1 and a base 2; a control PTC thermistor 3; a start PTC thermistor 4; a TRIAC 5; a first terminal 6, and a second terminal 7. When the starter is connected to a motor driving circuit, the first terminal 6 and the second terminal 7 are respectively connected to terminals of the motor's main winding (run winding) and that of the motor's secondary winding (start winding). By way of non-limiting example embodiment, the TRIAC 5 can be any suitable components such as part numbers NXP BTA206-800CT, BJ137-600-OT, etc.

Figure 4:
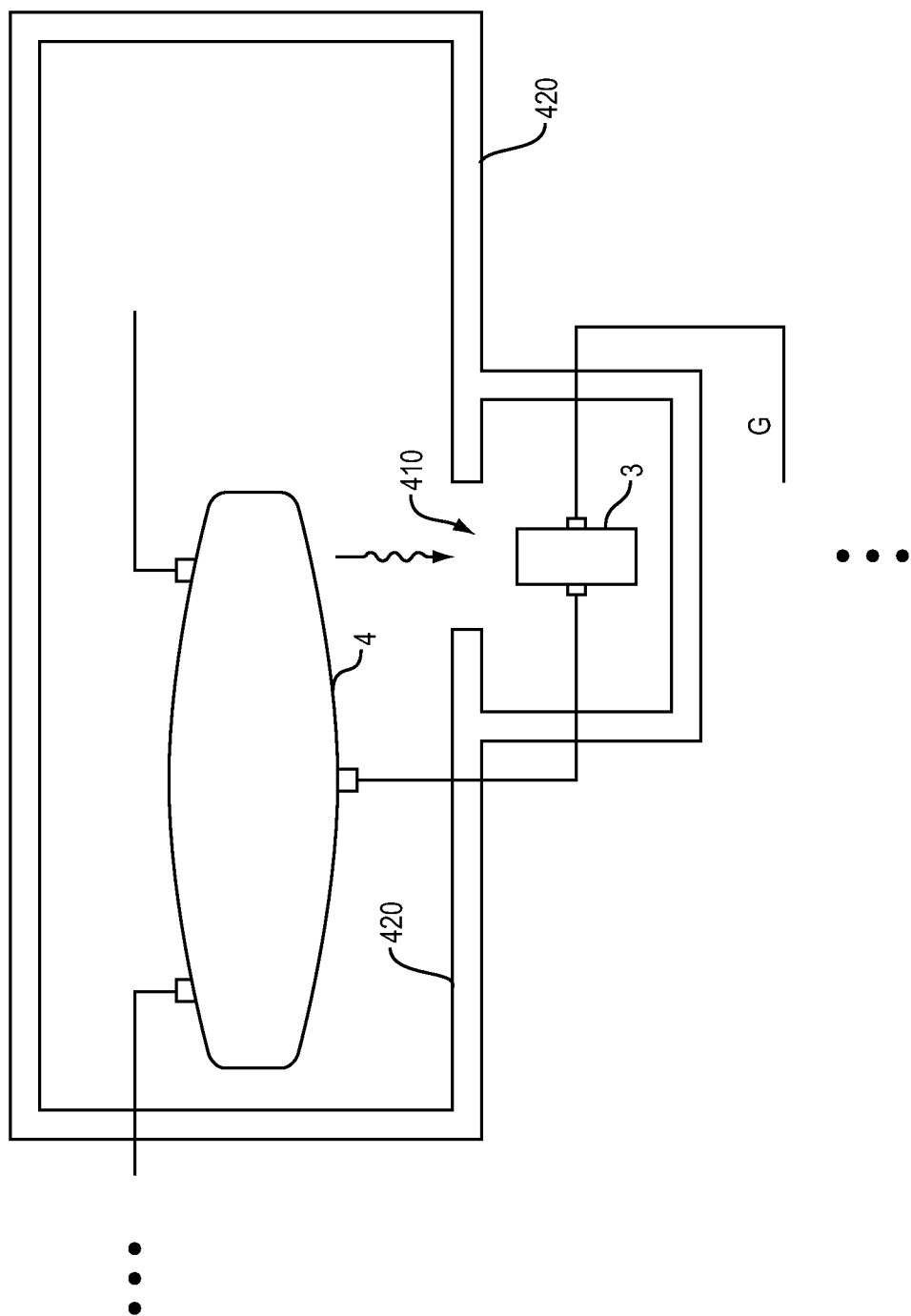
FIG. 4 is an example diagram illustrating an aperture in a respective housing enabling a transfer of heat between a main PTC thermistor and a control PTC thermistor according to embodiments herein.

In one embodiment, the control PTC thermistor 3, the start PTC thermistor 4, and the TRIAC 5 reside in the housing. The housing can include a corresponding aperture (a window) enabling heat to flow from the start PTC thermistor 4 to the control PTC thermistor 3. An example of this is shown in FIG. 4.

Figure 2:
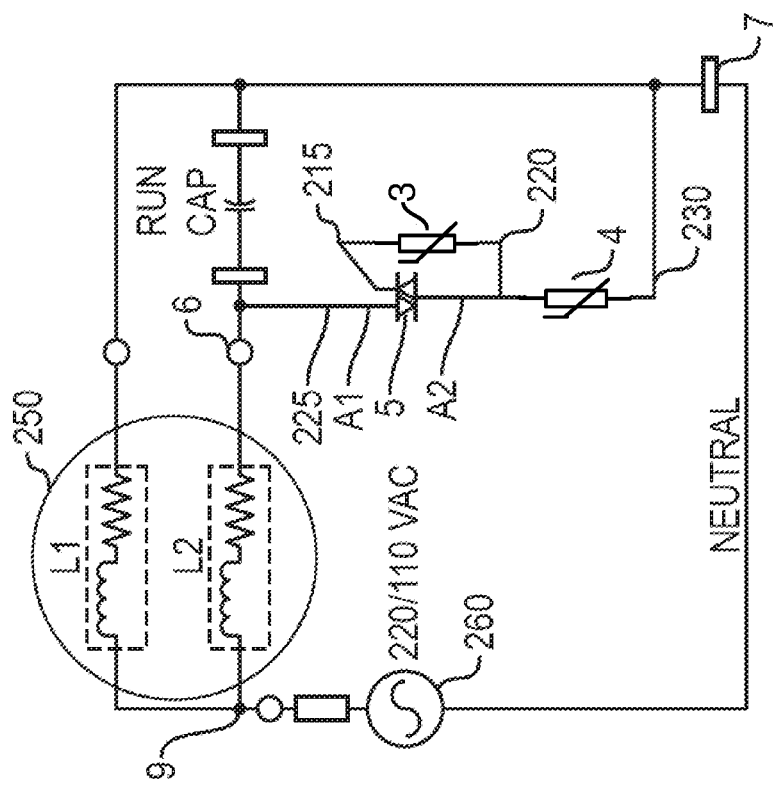
FIG. 2 is a schematic view showing the PTC starter connected in a motor driving circuit to drive a corresponding motor according to embodiments herein.
Figure 3:
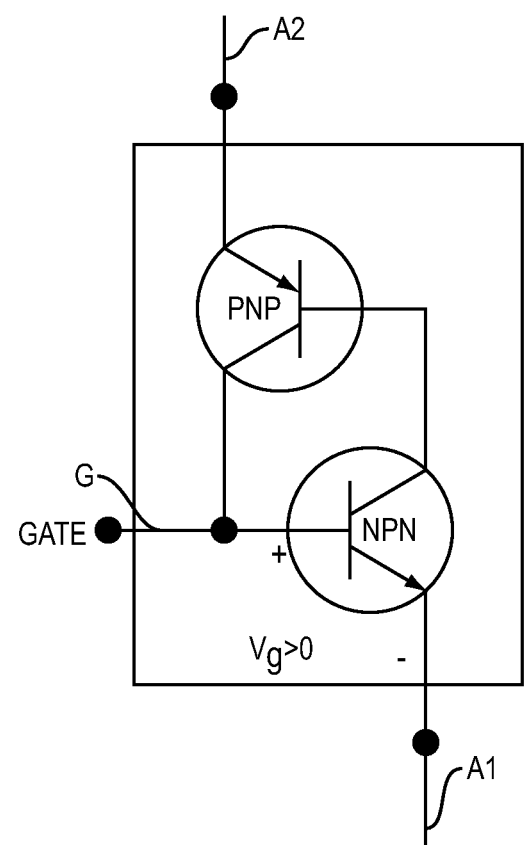
FIG. 3 is a diagram illustrating an example of internal details of a TRIAC according to embodiments herein.

As indicated by node 215, a first electrode (or first axial end) of the control PTC thermistor 3 is electrically connected to the gate, G, of the TRIAC (also shown in FIG. 2). As indicated by node 220, a first electrode A2 (or second axial end) of the control PTC thermistor 3 is electrically connected with both the first main electrode of the TRIAC 5 and the first electrode of the start PTC thermistor 4. In one embodiment, the first electrode and second electrode of the control PTC thermistor 3 are sufficiently small to prevent dissipation of heat to other components.

As shown, the first electrode A1 (node 225) of the TRIAC 5 and the second electrode 230 of the start PTC thermistor 4 are electrically connected with to the first terminal 6 and the second terminal 7, respectively. In other words, the electrode 225 (A1) is connected to terminal 6 of the secondary winding L2 of motor 250. Node 230 is connected to terminal 7.

FIG. 2 is a schematic view showing the PTC starter thermistor 4 being connected in the motor driving circuit. As shown and previously discussed, the start PTC thermistor 4 is connected in series with the TRIAC 5. The first electrode (node 215) of the control PTC thermistor 3 is electrically connected to the gate G of the TRIAC 5. As further shown, the control PTC thermistor 3 is connected in series with the start PTC thermistor 4. Current through the control PTC thermistor 3 and corresponding gate of the TRIAC 5 control the degree to which current is allowed to flow through corresponding winding L2.

In one embodiment, the resistance of the control PTC thermistor 3 is substantially or greatly larger than the resistance of the start PTC thermistor 4. By way of non-limiting example embodiment, the resistance of the start PTC thermistor 4 can be 3.9~68Ω when the temperature is under 25° C. with a steady power below 3 W. Additionally, the resistance of the control PTC thermistor 3 can be 3000~6000Ω when the temperature is under 25° C. with a steady power below 0.30 W.

Optionally, the starter may include an elastic support 8 (FIG. 1) for the start PTC thermistor 4. The elastic support 8 contacts the second electrode of the start PTC thermistor 4 and applies an elastic force thereon, so as to form a reliable contact between the terminal 7 and the second electrode of the start PTC thermistor 4 as well as the second terminal 9. Optionally, the control PTC thermistor 3 is sandwiched between two elastic supports 9, 10. One support 9 forms a reliable contact between the second electrode of the control PTC thermistor 3 and the first electrode of the start PTC thermistor 4 and TRIAC heatsink (terminal A2). Another support 10 forms a reliable contact between the first electrode of the control PTC thermistor 3 and the gate of the TRIAC 5.

When the motor 250 is powered (based on the application of voltage from voltage source 260) and begins to start, current flows through the start PTC thermistor 4 and the control PTC thermistor 3 to the gate G of the TRIAC 5. The start PTC thermistor 4 and the control PTC thermistor 3 are initially at a normal temperature (such as ambient temperature of air assuming that they are cooled sufficiently). In such an instance, as mentioned above, they have a low resistance during the motor 250 start condition during which voltage from voltage source 260 is applied across a combination of motor winding L2 and terminal 7. In one embodiment, the voltage source 260 is an alternating current or AC voltage source such as 110 VAC or 220 VAC. The current through the gate G is large enough for the TRIAC 5 to turn on. Thus, large current for starting the motor 250 flows through the secondary winding L2 through the start PTC thermistor 4 and the TRIAC 5.

After the motor has been started, such as after a certain amount of time when a respective shaft of the motor the motor turns, the current flows through the start PTC thermistor 4 and causes the start PTC thermistor 4 to be heated, increasing its temperature. A substantial current through the start PTC thermistor 4 can result in the control PTC thermistor 3 heating up quickly such as within less than several seconds. In certain embodiments, the PTC thermistor 3 heats up on the order of milliseconds, microseconds, etc.

In accordance with further embodiments, start PTC thermistor 4 starts out at around 4.7 to 30 ohms at 20° C. (around room temperature) before application of voltage source 260. Application of voltage source 260 as shown causes current to flow through the start PTC thermistor 4 and winding L2. Based on a flow of current, the start PTC thermistor 4 heats up to greater than a temperature such as 100° C. after around 600 milliseconds of applying voltage source 260. The control PTC thermistor 3 receives sufficient heat from start PTC thermistor 4 (through aperture 410 of partition 420 in FIG. 4) heating it to a temperature such as greater than 100° C. In other words, since the start PTC thermistor 4 and the control PTC thermistor 3 are thermally close to each other (e.g., there is an air gap separating the start PTC thermistor 4 and the control PTC thermistor 3) in the housing, the heat from the start PTC thermistor 4 heats the control PTC thermistor 3.

Initially, as mentioned, prior to application of voltage source 260, the control PTC thermistor 3 has a resistance value of between 3000 and 6000 ohms at 25° C. As previously discussed, when heated up above a temperature such as 100° C. based on heat received from start PTC thermistor 4, the control PTC thermistor 3 becomes a higher resistance (such as greater than 50 kohms). As the control PTC thermistor 3 is heated, its temperature increases. The increase temperature increases a resistance of the control PTC thermistor 3, reducing an amount of current inputted to the gate G of TRIAC 5. In other words, in such an instance, in response to the increased temperature, the resistance of the PTC thermistor 3 increases rapidly and the current through the corresponding gate decreases rapidly. This causes the TRIAC 5 to turn substantially OFF so as to cut off substantially most, if not all, of the current through the secondary winding L2.

Since the motor has started, there is no longer need to drive current through the TRIAC 5 and the start PTC thermistor 4 to secondary winding L2. In other words, after the start PTC thermistor 4 heats the control PTC thermistor 3, shutting off the TRIAC 5. A high thus impedance path is formed between node 225 and node 230. In such an instance, current no longer flows (or is substantially reduced) through the secondary winding L2. Current continues to flow through winding L1, causing the shaft of the motor 250 to turn. In one embodiment, there is enough current through the control PTC thermistor 3 such that it stays hot enough (and in a high resistance state) to prevent large currents from flowing through the TRIAC between node A1 to node A2.

In one non-limiting example embodiment, the control PTC thermistor 3 is connected in series with the start PTC thermistor 4 as shown. In this state, the motor can be started easier than an alternate configuration in which the control PTC thermistor 3 is connected in parallel with the start PTC thermistor 4. For example, the control PTC thermistor 3 is heated by the start PTC thermistor 4 instead of by its own respective pass-through current. Thus, the control PTC thermistor 3 will not suffer from a large start current impact. Compared to a configuration in which the control PTC thermistor 3 and the start PTC thermistor 4 are connected in parallel, according to embodiments herein in which the control PTC thermistor 3 and the start PTC thermistor 4 are connected in series as shown in FIG. 2, the life of the control PTC thermistor 3 is longer and the safety is higher.

In further embodiments, the volume occupied by the control PTC thermistor 3 (component) is very small such as less than 30 mm$^3$. By way of non-limiting example embodiment, the volume occupied by the control PTC thermistor 3 can be less than 10 mm$^3$. Thus, the power of the control PTC thermistor 3 is low and the operation space for connection becomes large. As previously discussed, the control PTC thermistor 3 and the start PTC thermistor 4 can be positioned very close (such as touching or in close thermal communication via an air gap) to each other such as less than 5 mm so as to transfer heat between each other via radiation and/or convection. In one embodiment, the control PTC thermistor 3 and the start PTC thermistor 4 are disposed to be less than 3 mm apart, although these components can be spaced by any suitable amount. As previously discussed, during the start mode of the motor 250, the eventual transfer of heat from the start PTC thermistor 4 to the control PTC thermistor 3 results in a substantially high resistance between node 225 and node 230. In accordance with further embodiments, either or both of the start PTC thermistor 4 control PTC thermistor 3 can be coated with a suitable material such as a dark layer of material (such as paint) to increase the effectiveness of the thermal coupling between each other. In other words, black or dark bodies are more efficient at radiating and absorbing heat.

In accordance with further embodiments such as when the control PTC thermistor 3 is connected in series with the start PTC thermistor 4 as previously discussed, vibration of the compressor due to half wave cycle is substantially reduced and/or eliminated.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A PTC starter, apparatus to deliver input current to a motor winding, the PTC starter apparatus comprising:
   a housing;
   a control PTC thermistor;
   a start PTC thermistor;
   a TRIAC device; and
   wherein the control PTC thermistor, the start PTC thermistor and the TRIAC are disposed in the housing, the start PTC thermistor being connected in series with the TRIAC device, the input current flowing through the start PTC thermistor and the TRIAC device to the motor winding, wherein a first electrode of the control PTC thermistor is connected to a gate (G) of the TRIAC device, and wherein a second electrode of the control PTC thermistor is connected to an intermediate node electrically connecting the start PTC thermistor and the TRIAC device, the control PTC thermistor operable to convey a control current from the intermediate node to the gate of the TRIAC device to control the input current delivered to the motor winding.

2. The PTC starter apparatus according to claim 1, wherein the volume of the control PTC thermistor is less than 10 mm$^3$.

3. The PTC starter apparatus as in claim 2 wherein the resistance of the control PTC thermistor is 3000~6000Ω under 25° C. with a steady power below 0.30 W.

4. The PTC starter apparatus according to claim 1, wherein the distance between the control PTC thermistor and the start PTC thermistor is less than 3 mm.

5. The PTC starter apparatus as in claim 4 wherein the resistance of the control PTC thermistor is 3000~6000Ω under 25° C. with a steady power below 0.30 W.

6. The PTC starter apparatus as in claim 1, wherein the resistance of the control PTC thermistor is 3000~6000Ω under 25° C. with a steady power below 0.30 W.

7. The PTC starter apparatus according to claim 1, wherein the resistance of the control PTC thermistor is substantially larger than a resistance of the start PTC thermistor.

8. The PTC starter apparatus according to claim 1, wherein the resistance of the start PTC thermistor is 3.9~68Ω under 25° C. with a steady power below 3 W.

9. The PTC starter apparatus as in claim 1, wherein, the volume of the control PTC thermistor is less than 30 mm$^3$, and the distance between the control PTC thermistor and the start PTC thermistor is less than 5 mm.

10. The PTC starter apparatus as in claim 1 further comprising:
a path disposed in the housing, the path facilitating heat to flow from the start PTC thermistor to the control PTC thermistor, the heat causing the control PTC thermistor to increase in resistance and reduce a magnitude of the control current inputted to the gate of the TRIAC device, the reduced magnitude of the control current causing the TRIAC device to reduce a magnitude of the input current to the motor winding.

11. The PTC starter apparatus as in claim 10, wherein the path passes through a window disposed between the start PTC thermistor and the control PTC thermistor, the input current through the start PTC thermistor causing the start PTC thermistor to produce the heat.

12. The apparatus as in claim 11, wherein a first node of the control PTC thermistor is electrically coupled to the gate node of the TRIAC and a second node of the control PTC thermistor is electrically coupled to an intermediate node coupling the TRIAC to the start PTC thermistor.

13. An apparatus to provide input current to a motor winding, the apparatus comprising:
a TRIAC (TRIode for Alternating Current)to control conveyance of the input current to the motor winding;
a control PTC (Positive Temperature Coefficient) thermistor, the control PTC thermistor coupled to a gate of the TRIAC to control a magnitude of the input current passing through the TRIAC to the motor winding; and
a start PTC thermistor, the start PTC thermistor in thermal communication with the control PTC thermistor, heat generated by the start PTC thermistor controlling a temperature of the control PTC thermistor, the temperature of the control PTC thermistor controlling the magnitude of the input current passing through the TRIAC to the motor winding.

14. The apparatus as in claim 13, wherein the start PTC thermistor is disposed in series with the control PTC thermistor; and
wherein the temperature of the control PTC thermistor controls a magnitude of control current inputted through the start PTC thermistor to the gate of the TRIAC.

15. The apparatus as in claim 14, wherein the start PTC thermistor is disposed in series with the TRIAC.

16. The apparatus as in claim 15, wherein a series circuit path through the TRIAC and the start PTC thermistor controls the motor winding in a respective motor.

17. The apparatus as in claim 16, wherein the motor, winding is a secondary winding in the respective motor, the secondary winding activated during start up of the respective motor.

18. The apparatus as in claim 17, wherein the transfer of the heat generated by the start PTC thermistor to the control PTC thermistor increases a respective resistance of the series circuit path.

19. The apparatus as in claim 18, wherein the increased resistance of the series circuit path substantially reduces the amount of current passing through the TRIAC and the secondary winding.

20. The apparatus as in claim 14, wherein conveyance of the heat from the start PTC thermistor to the control PTC thermistor causes a resistance of the control PTC thermistor to incrase, the increased resistance of the start PTC thermistor reducing a magnitude of the control current conveyed through the control PTC thermistor to the gate of the TRIAC, the reduced magnitude of the control current reducing the magnitude of the input current delivered to the motor winding through the TRIAC.

21. The apparatus as in claim 13, wherein the control PTC thermistor and the start PTC thermistor are coated with a dark material, facilitating a transfer of the heat generated by the start PTC thermistor to the control PTC thermistor.

* * * * *